United States Patent [19]

Seiden

[11] 4,436,576

[45] Mar. 13, 1984

[54] APPARATUS FOR FORMING BOTTOM HEAT SEALS

[75] Inventor: Frederick C. Seiden, Holmes Beach, Fla.

[73] Assignee: Rexham Corporation, New York, N.Y.

[21] Appl. No.: 255,760

[22] Filed: Apr. 20, 1981

[51] Int. Cl.³ .............................................. B32B 31/04
[52] U.S. Cl. ..................... 156/543; 53/374; 156/553; 156/582; 493/205; 493/208
[58] Field of Search ........... 156/582, 543, 553, 583.5; 493/205, 208; 53/373; 493/198

[56] References Cited

U.S. PATENT DOCUMENTS

| | | | |
|---|---|---|---|
| 2,422,676 | 6/1947 | Haman | 156/582 X |
| 2,949,151 | 8/1960 | Goldstein | 156/582 X |
| 3,153,607 | 10/1964 | Ambler | 156/582 X |
| 3,339,337 | 9/1967 | Rapp | 53/562 |
| 3,350,988 | 11/1967 | Schultz | 493/198 X |
| 3,933,568 | 1/1976 | Schmermund | 156/582 X |
| 4,018,641 | 4/1977 | Donaldson | 156/582 X |

Primary Examiner—John Sipos
Attorney, Agent, or Firm—Leydig, Voit, Osann, Mayer & Holt, Ltd.

[57] ABSTRACT

Two face-to-face and continuously moving strips of heat-sealable material are guided around a drum adapted to rotate continuously about an upright axis and carrying a heated sealing ring on its lower end. The sealing ring is smaller in diameter than the drum and is offset radially inwardly from the drum in order to seal the bottom margins of the strips together without forming wrinkles in the seal.

7 Claims, 6 Drawing Figures

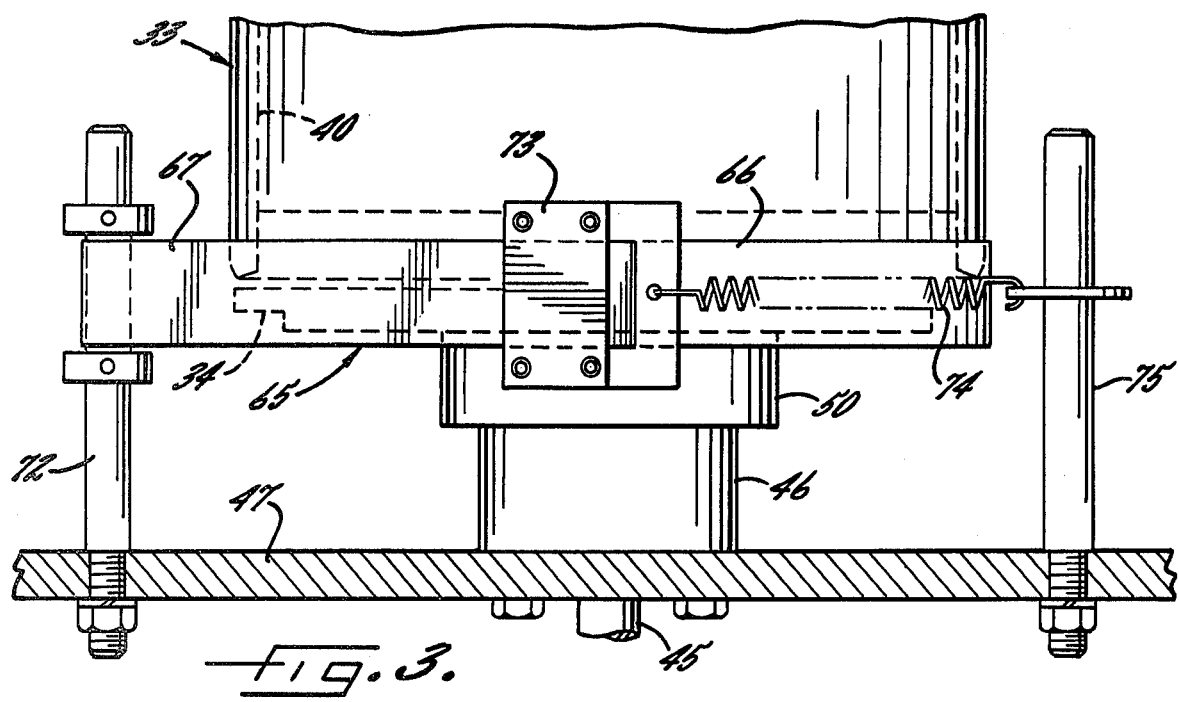
_Fig. 3._
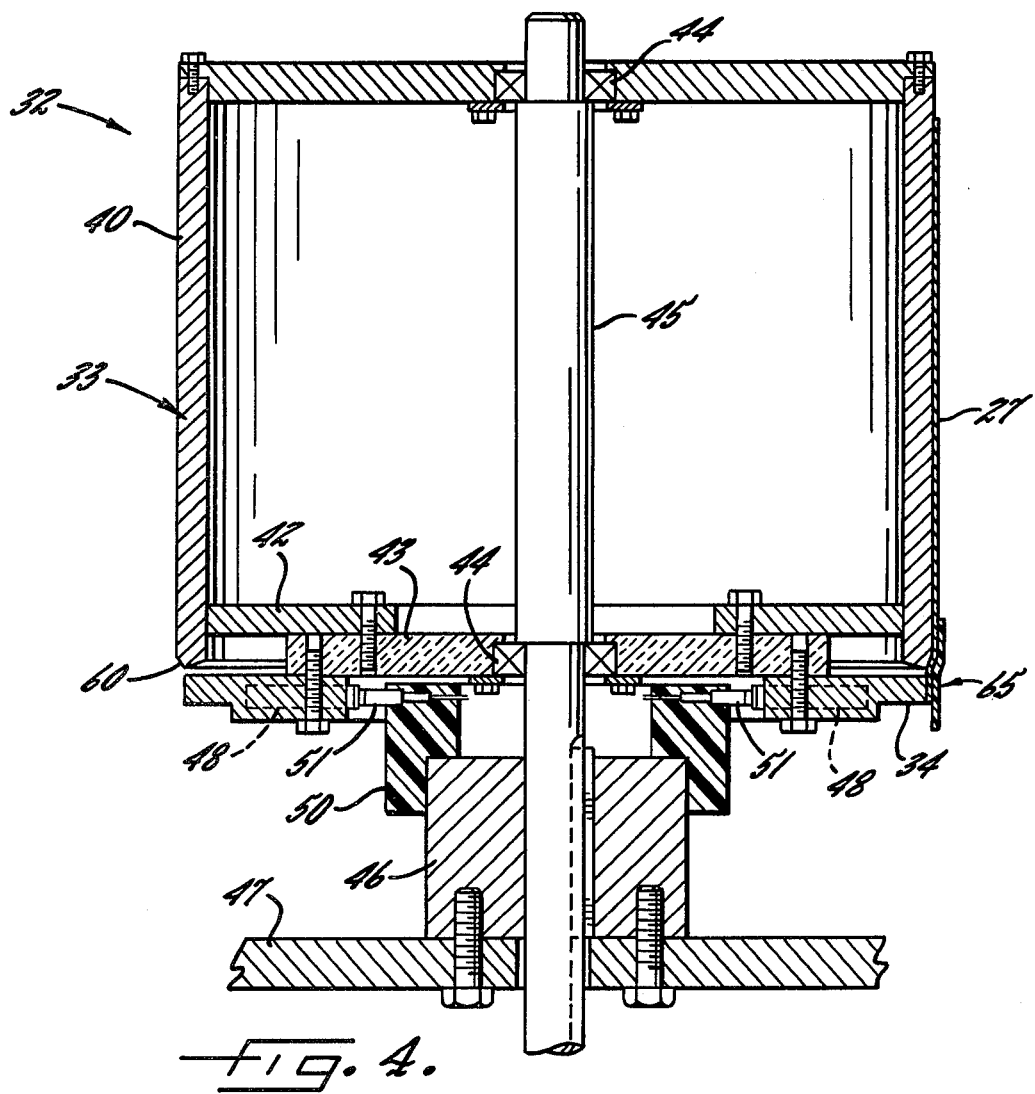
_Fig. 4._

APPARATUS FOR FORMING BOTTOM HEAT SEALS

BACKGROUND OF THE INVENTION

This invention relates to sealing apparatus which is particularly suitable for use in a pouch making machine of the type in which a flexible web of heat-sealable material is advanced and folded upwardly to form two face-to-face strips which are interconnected by a bottom fold. More specifically, the invention relates to apparatus for forming a heat seal along the bottom fold or margins of the strips as the strips are advanced along a predetermined path at high speed and with continuous motion as opposed to slower intermittent or step-by-step motion.

The invention has even more specific reference to sealing apparatus comprising a drum mounted to rotate about an upright axis and carrying a heated sealing ring on its lower end. The strips are guided around an arcuate portion of the drum and, as the strips are advanced, the drum is rotated. During advance of the strips and rotation of the drum, the lower margins of the strips are pressed together and one of the strips is pressed against the heated sealing ring. The applied heat and pressure seals the bottom margins of the strips to one another to form a bottom seal along the strips.

Difficulty has been encountered in forming a bottom seal which is free of wrinkles. When the flexible material is heated while being advanced, the material tends to stretch or grow in size to a point where the elastic limit of the material may be exceeded. As a result of the stretching, bubbles and wrinkles are formed in the material as it is heated and, when the material is subsequently cooled, it is left with voids which cause the seal surfaces to be wrinkled.

SUMMARY OF THE INVENTION

The general aim of the present invention is to provide new and improved sealing apparatus of the above general type in which the sealing drum and the sealing ring are uniquely related so as to form a substantially wrinkle-free seal along the margins of the strips as the latter are advanced.

A more detailed object is to achieve the foregoing by providing sealing apparatus in which the sealing ring is of smaller diameter than the drum and is offset radially inwardly from the drum. As the strips move around the drum, their upper portions are pressed toward the drum while the lower seal portions are pressed inwardly toward the reduced diameter sealing ring and are slightly shrunk with respect to the upper portions. As the strips leave the drum, the shrunk bottom seal portions, which are weak as a result of the heating, are automatically stretched to a tight condition to eliminate voids and wrinkles.

Still another object of the invention is to construct the bottom of the drum in a novel manner in order to effect a smooth transition between the drum and the reduced diameter sealing ring and to provide a relatively wide heat insulating air gap between the bottom of the drum and the top of the sealing ring while avoiding the creation of a gap of substantial width between the outer surfaces of the drum and the ring.

The invention also resides in the provision of a unique curtain for pressing the strips against one another and for pressing the strips toward the drum and the sealing ring.

These and other objects and advantages of the invention will become more apparent from the following detailed description when taken in conjunction with the accompanying drawings.

BRIEF DESCRIPTION OF THE DRAWINGS

FIG. 3 is an enlarged fragmentary side elevational view of the sealing apparatus as viewed along the line 3—3 of FIG. 2.

FIGS. 4, 5 and 6 are enlarged fragmentary cross-sections taken substantially along the lines 4—4, 5—5 and 6—6, respectively, of FIG. 2.

DETAILED DESCRIPTION OF THE PREFERRED EMBODIMENT

Figure 1:
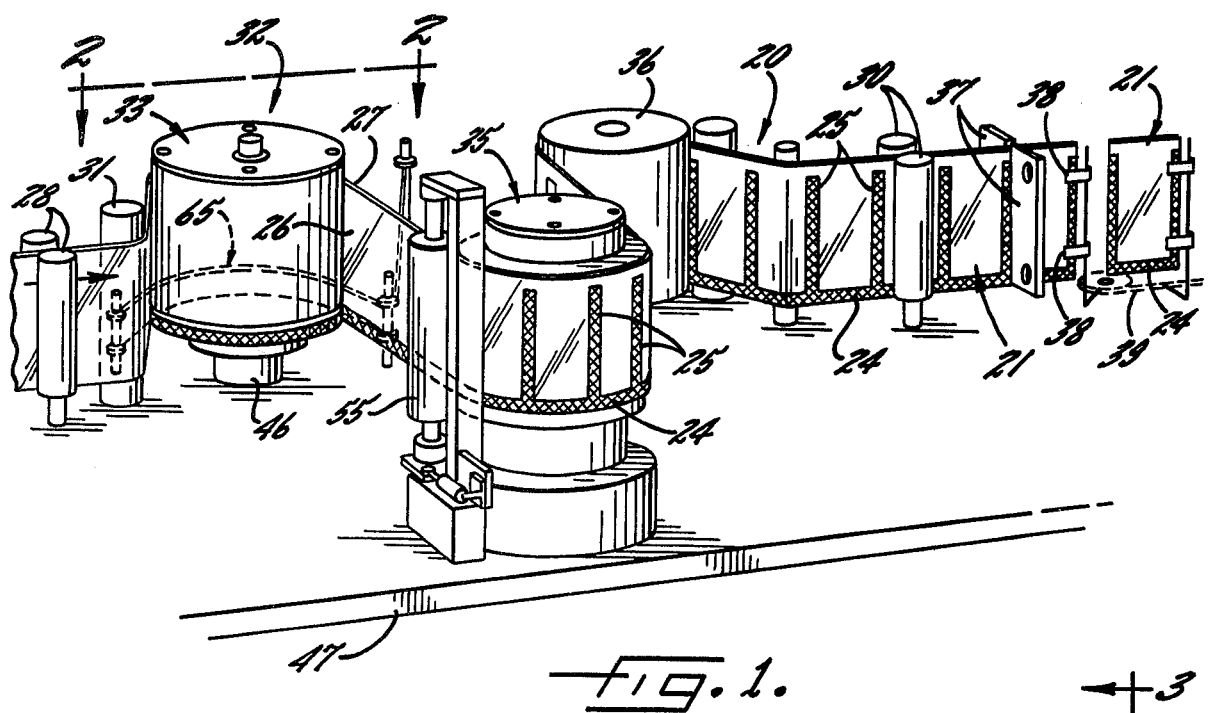
FIG. 1 is a fragmentary perspective view of a typical pouch making machine equipped with new and improved sealing apparatus incorporating the unique features of the present invention.
Figure 2:
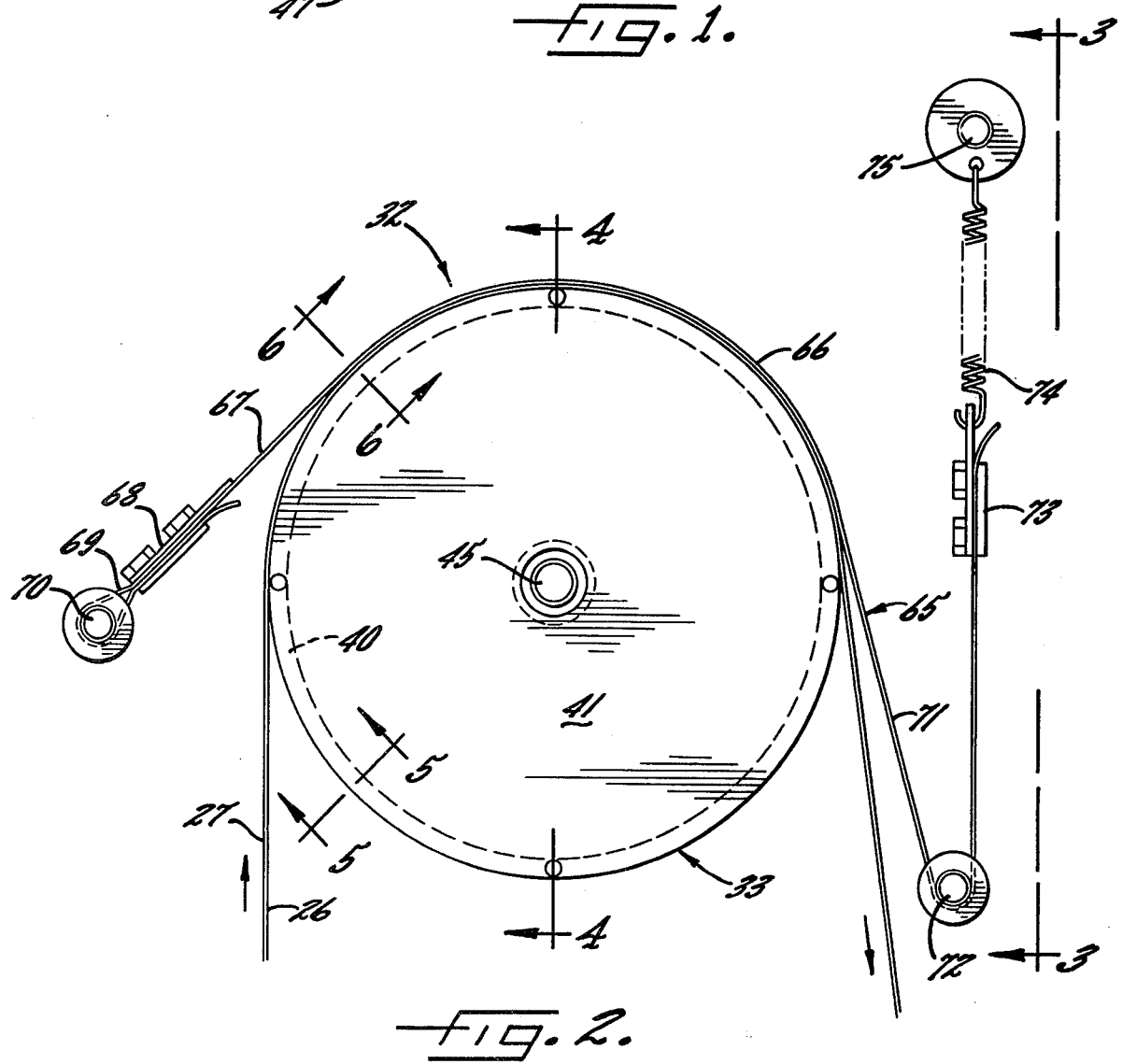
FIG. 2 is an enlarged top plan view of the sealing apparatus as viewed along the line 2—2 of FIG. 1.

As shown in the drawings for purposes of illustration, the invention is embodied in a packaging machine 20 for forming pouches 21 each composed of two rectangular panels disposed face-to-face and joined together at their margins, preferably by a fold and a heat seal 24 at the bottom and by heat seals 25 at the sides. Herein, the pouches 21 are made from a web of sheet material either composed of or coated on one side with a thermoplastic material and drawn off of a supply roll (not shown) rotatable about a horizontal axis. As the web is advanced, it is folded longitudinally and upwardly by a plow (not shown) to form two face-to-face strips 26 and 27 (FIG. 2) which are joined at their bottom margins by a fold. The strips preferably are disposed in a vertical plane and, in the present instance, are advanced with high speed continuous motion as opposed to slower intermittent or step-by-step motion. For this purpose, two pairs of continuously rotating feed rolls 28 and 30 (FIG. 1) engage opposite sides of the strips and respectively draw the web material off of the supply roll and through the pouch forming section of the machine 20.

As the strips 26 and 27 are advanced by the feed rolls 28 and 30, the strips are guided by a roller 31 (FIG. 1) around bottom sealing apparatus 32 comprising a continuously rotating botton sealing drum 33 (FIG. 4) having a heated, ring-like sealing bar 34 which engages the forward strip 26 to seal the longitudinally extending bottom margins of the strips together and form the bottom seal 24. Thereafter, the strips are guided past a side sealing mechanism 35 (FIG. 1) which forms the side seals 25 by sealing the strips together along vertical bands located at equally and longitudinally spaced positions along the strips. The strips then are guided around a continuously rotating cooling drum 36 which chills the newly formed seals.

At periodic intervals, a cutter 37 (FIG. 1) severs successive pouches 21 from the leading end portion of the strips 26 and 27 by cutting through the seals 25 intermediate their edges so that each seal 25 forms the trailing side seal of one pouch and the leading side seal of the next pouch. After being separated from one another, the pouches 21 preferably are accelerated to a desired spacing and are gripped by carriers 38 attached to a continuously moving chain 39 which advances the pouches through a filling station where a quantity of product such as food product is deposited into the open upper ends of the pouches. Thereafter, the upper ends of the pouches are sealed to enclose the product in the pouches. Alternatively, the pouches 21 which are severed from the strips 26 and 27 may simply be packed away and stored for subsequent use.

The bottom sealing drum 33 (FIG. 4) comprises an upright cylindrical shell 40 whose upper end is closed by a top plate 41. A bottom plate 42 is disposed within the shell adjacent the lower end thereof and carries a laminated phenolic disc 43. Extending through bearings 44 in the plate 41 and the disc 43 is an upright shaft 45 which supports the drum for rotation about an upright axis coinciding with the axis of the shaft. The lower end portion of the shaft 45 extends through a fixed block 46 which is supported on a frame 47.

Figure 5:
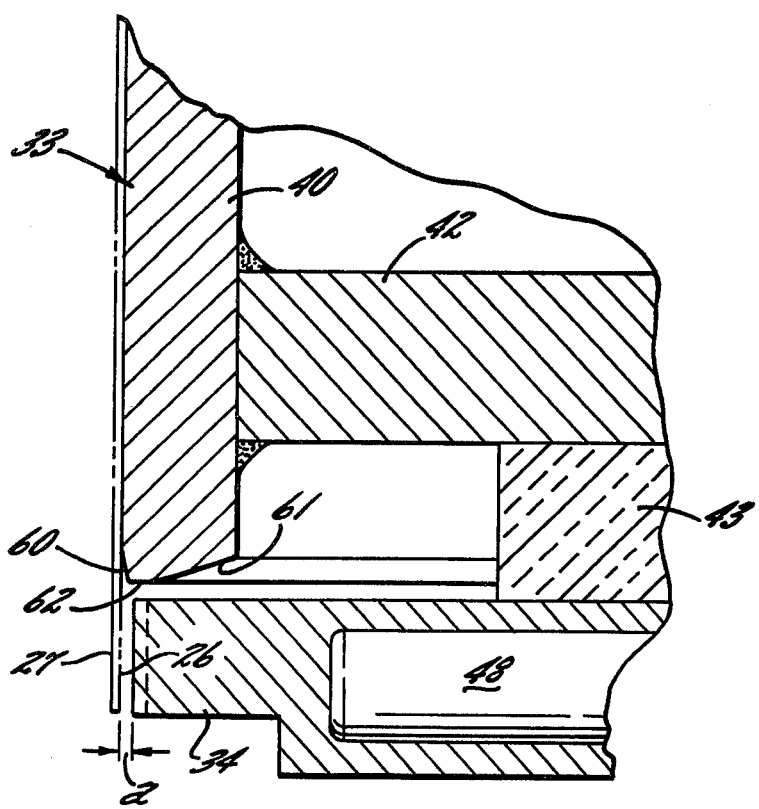

As shown in FIGS. 4 and 5, the sealing ring 34 is secured to the lower side of the phenolic disc 43 and carries electrical heating elements 48. A commutator ring 50 (FIG. 4) is secured to the block 46 and includes brush assemblies 51 connected to a voltage source and disposed in rubbing contact with the inner side of the sealing ring so as to conduct energizing current to the heating elements and thereby effect heating of the sealing ring. The phenolic disc 43 tends to insulate the heated ring 34 from the plate 42 and the shell 40 of the drum 33.

The strips 26 and 27 are guided around approximately the rear one-half of the bottom sealing drum 33 by the roller 31 and by a roller 55 (FIG. 1) which is associated with the side sealing apparatus 35. As the strips are advanced, they frictionally engage the drum 33 and cause the drum to turn about the axis of the shaft 45. At the same time, the lower portion of the strip 27 is pressed against the lower portion of the strip 26 which, in turn, is pressed against the outer side of the heated sealing ring 34. The applied heat and pressure seals the lower portions of the strips together to form the bottom seal 24. With prior sealing arrangements, air bubbles tend to form in the advancing strips as they are pressed against the heated ring and, when the strips are subsequently cooled, the bubbles result in voids which cause the bottom seal area to be wrinkled.

Figure 6:
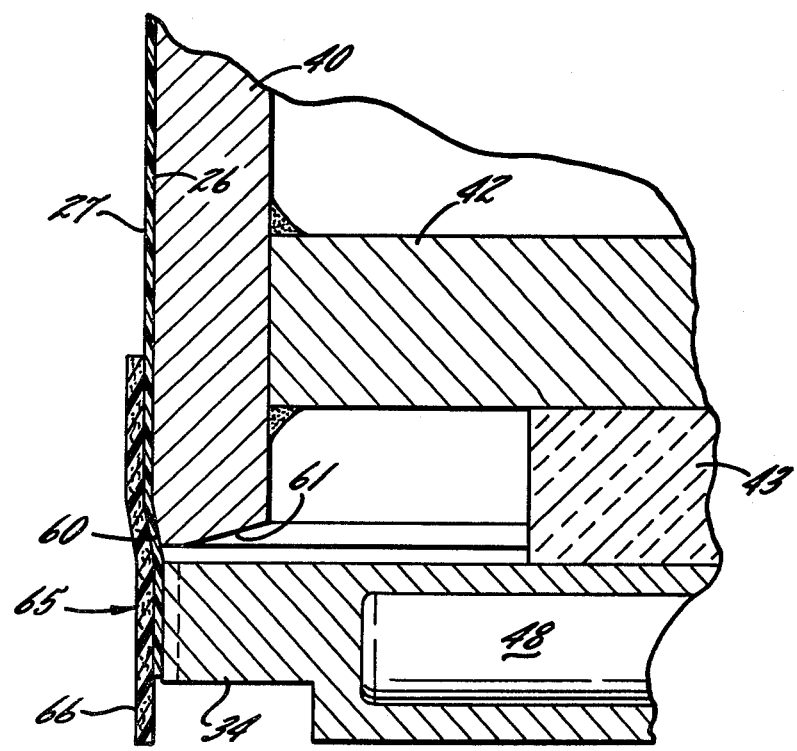

In accordance with the present invention, the sealing ring 34 is smaller in diameter than the shell 40 of the drum 33 (see FIGS. 5 and 6) and is offset radially inwardly from the shell so as to avoid forming wrinkles in the bottom margins of the strips 26 and 27 when the bottom margins are heated and sealed. As a result of the sealing ring being smaller in diameter than the shell, the bottom margins of the strips are pressed inwardly and are momentarily shrunk relative to the upper portions of the strips as the strips travel around the drum. As the strips leave the drum, the heated and shrunk lower portions thereof are automatically stretched to a tight condition so as to remove any wrinkles, bubbles or voids from the strips and thereby leave the bottom seal 24 virtually wrinkle-free.

More specifically and shown in FIG. 5, the outer surface of the sealing ring 34 is offset radially inwardly from the outer surface of the shell 40 by a relatively small distance a. When the drum 33 has a diameter of about 13 inches, the offset distance a is in the neighborhood of 0.30 inches. The sealing ring 34 has a height of about one inch.

To avoid a sharp transition between the outer surface of the ring 34 and the outer surface of the shell 40, the extreme lower end portion of the outer surface of the shell is formed with a downwardly and inwardly inclined bevel 60 (FIG. 5). Herein, approximately the lower 0.10 inches of the outer surface of the shell is beveled at an angle of about 10 degrees. By virtue of the bevel, the transition between the shell and the sealing ring is relatively smooth.

The lower end portion of the shell 40 also is constructed so as to create an air gap of relatively large width between the lower end of the shell and the upper end of the ring 34 while avoiding a gap of substantial width between the outer surfaces of the shell and the ring. For this purpose, the inner portion 61 (FIG. 5) of the lower end of the drum is inclined upwardly and inwardly at an angle of about 15 degrees while the outer portion 62 of the lower end of the shell is horizontal and extends parallel to the upper end of the ring. As a result of the inclined surface 61, the major portion of the lower end of the shell 40 is spaced upwardly from the ring 34 by a substantial distance to help insulate the shell from the heated ring. At the same time, the vertical gap between the outer surfaces of the shell and the ring is relatively small and is free of extremely sharp edges so as to prevent the strips 26 and 27 from creeping in between the shell and the ring and being creased or torn.

Unique means are provided for pressing the strip 27 against the strip 26 and for pressing the strip 26 against the ring 34 and the shell 40. Herein, these means comprise a flexible curtain 65 (FIGS. 2, 3 and 6) having an arcuate portion 66 concentric with the drum 33 and located in face-to-face engagement with the outer side of the strip 27. The curtain preferably is made from a sheet of fiber glass which is coated on its inner side with a tetrafluoroethylene resin (e.g., Teflon). The arcuate portion 66 of the curtain 65 extends vertically from a point about $\frac{3}{8}$ inches below the ring 34 to a point about $\frac{5}{8}$ inches upwardly from the lower end of the shell.

The upstream end portion 67 (FIG. 2) of the curtain 65 is tangent to the drum 33 at about an eleven o'clock position and extends through a clamp 68 such that a loop 69 is formed at the end of the curtain. The loop is hooked around a stationary upright post 70 which serves to anchor the upstream end of the curtain. The downstream end portion 71 of the curtain 65 extends tangent to the drum 33 at about a two o'clock position and is guided around a stationary upright post 72 which holds the curtain tangent to the drum. The end of the curtain is attached to a bracket 73 which, in turn, is connected to one end of a contractile spring 74. At its other end, the spring is connected to a stationary upright post 75. Accordingly, the spring acts on the curtain to tension the curtain around the drum. The curtain presses the strip 27 against the strip 26 and acts through the strip 27 to press the strip 26 against the ring 34 and the lower end of the shell 40. Being flexible, the curtain complies with the transition between the shell and the ring (see FIG. 6). As a result, the strip 26 is held against the shell to create the necessary traction to rotate the drum 33 and, at the same time, the bottom margins of the strips are pressed toward the ring 34 to create the pressure necessary to seal the margins together.

Because the ring 34 is offset radially inwardly from the shell 40, the bottom margins of the strips 26 and 27 tend to be shrunk relative to the upper portions of the strips when the bottom margins are pressed inwardly toward the ring by the curtain 65. As a result, the bottom margins, upon being heated by the ring, do not tend to stretch or grow in size to the same extent as would be the case if the outer surface of the ring were flush with the outer surface of the shell. When the shrunken bottom margins are heated, the material tends to become weak and thus, when the bottom margins roll off of the exit end of the ring 34, the tension placed in the strips 26 and 27 by the feed rolls 30 causes the bottom margins to be stretched taut. Such stretching removes voids and bubbles from the newly formed bottom seal 24 so that ultimate seal is virtually free of wrinkles and creases.

I claim:

1. Apparatus for sealing together the extreme bottom portions of two face-to-face upright strips of heat sealable material as the strips are advanced lengthwise along a predetermined path, said apparatus comprising a substantially cylindrical drum having a predetermined outer diameter, means supporting said drum to rotate about an upright axis, a circular sealing ring located below and rotatable with the lower end of said drum, said sealing ring being concentric with said drum and having an outer diameter smaller than the outer diameter of the drum whereby the outer surface of said sealing ring is spaced radially inwardly from the outer surface of said drum, said sealing ring defining the lowermost strip-engaging surface of said apparatus, means for heating said sealing ring, said strips being guided so that the inner of said strips contacts a first pre-selected arc around the outer surface of said drum, pressing means mounted adjacent the lower end of said drum and extending axially above and below said lower end a distance sufficient to span an axial portion of said drum and said sealing ring, said pressing means pressing against said outer strip and acting through such strip to press an upper portion of the inner strip into engagement with a second and shorter preselected arc of the outer surface of said drum between the ends of said first arc and to press the bottom portion of said inner strip into engagement with a corresponding short arc of the outer surface of said sealing ring as said strips are advanced along said path so that between the ends of the first and second arcs said upper portion is in engagement with said drum and said bottom portion is free of engagement with said sealing ring whereby said sealing ring forms a substantially wrinkle-free seal along the bottoms of said strips.

2. Apparatus as defined in claim 1 in which said pressing means comprises a flexible curtain aving an arcuate portion concentric with said second arc and located outwardly of said outer strip, and means biasing the arcuate portion of said curtain into face-to-face engagement with the outer surface of said outer strip.

3. Apparatus as defined in claim 2 further including means anchoring one end portion of said curtain at a point upstream of said arcuate portion, said biasing means comprising a contractile spring having one of its ends fixed and having its other end connected to the other end portion of said curtain at a point downstream from said arcuate portion.

4. Apparatus as defined in claim 3 further including means engaging said curtain between said arcuate portion and said spring and holding part of said other end portion of said curtain tangent to said drum.

5. Apparatus as defined in claim 2 in which said curtain is coated with tetrafluorethylene resin.

6. Apparatus as defined in claim 1 in which the outer surface of the lower end portion of said drum is formed with a downwardly and inwardly inclined bevel.

7. Apparatus as defined in claims 1 or 6 in which the upper end of said sealing ring is spaced below the lower end of said drum, the lower end of said drum being defined by a generally horizontal outer surface and by an upwardly and inwardly inclined inner surface.

* * * * *